Nov. 30, 1965  J. J. SOWKO  3,220,455

TRACTION DEVICE FOR TIRES

Filed April 10, 1964

INVENTOR.
John J. Sowko
BY Green, McCallister & Miller

HIS ATTORNEYS

United States Patent Office 3,220,455
Patented Nov. 30, 1965

3,220,455
TRACTION DEVICE FOR TIRES
John J. Sowko, Pittsburgh, Pa., assignor to Firth Sterling, Inc., Pittsburgh, Pa., a corporation of Pennsylvania
Filed Apr. 10, 1964, Ser. No. 358,719
16 Claims. (Cl. 152—210)

This invention relates to a device for improving the traction of a vehicular tire and particularly, to a friction, traction or anti-skid device or plug for mounting usage or insertion in the tread of the tire.

Previous to my invention, there have been many anti-skid devices for use with tires, but none have been fully satisfactory. I have found that a device using a hard, wear and temperature-resistant pin element or part of carbide metal is highly effective, but that there is a problem involved in mounting such an element or part and in retaining it in an effective operating position within the tire tread. Heretofore, those skilled in the art have considered a resin holder as essential for an anti-skid element, on the theory that a highly non-conductive material will protect the camelback or resilient tread rubber from heat generated in the element, and that the resin material will wear down with the tire tread.

I have discovered, however, that a device making use of a carbide element and employing a resin holder of a good quality type of resin, such as Delrin, an acetal resin produced by Du Pont, when used with an ordinary passenger automobile, will retain a carbide element in place for only about 500 miles of average driving. Although traction or anti-skid tires are neded only a few months in the year in the more temperature climates, to provide economical transportation, they should have a usable effetcive mileage of at least 6,000 and preferably of about 10,000 miles. Although an acetal thermoplastic resin of an injection molded type has high strength and toughness, good resilience, and good resistance to corrosion, I have found that, in common with other resins, it is a poor conductor of heat. On the other hand, I have found that although a carbide element will withstand temperatures of up to about 1,000°, a resin holder, itself, tends to soften when it reaches a temperature of about 150° F. I have discovered that the crux of the problem is that a poor conductor type of holder tends to retain and concentrate heat generated about the joint or holding area for the carbide element; that is the reason why a resin holder device will have a short period of element-holding operating life. It will be noted that an acetal resin has a boiling point of about 217° to 219° F.

I have found that a considerable rise in temperature is caused in an automobile tire during stopping and starting operations and traveling around curves, and that the temperature may go up to about 300° to 400° F. or higher. Although generally there is a more or less momentary rise in temperature, I have found that it is essential to quickly dissipate the heat thus generated in order to maintain a proper bond between the carbide element and the holder.

Although it has heretofore been thought that the holder should act as an insulator to protect the tread of the tire from heat, I have found that if the heat is quickly dissipated by a suitable good or efficient conducting means that there is no damage to the tire or its tread and, in fact, that the tire tread can withstand high momentary temperatures and dissipate heat effectively in its relatively wide area without adversely affecting its own holding action as to embedded traction or non-skid devices.

Also, in endeavoring to employ holders of a resin type, I found that it is necessary to do special machining work on the carbide element so as to provide it with a knurled or serrated surface to enable it to be held within the holder. Such work, particularly in view of the small size of the carbide elements, greatly increases the cost of the device.

It has thus been an object of my invention to solve the problem involved in making use of carbide elements as traction elements for tires and to provide a device that will withstand high temperatures induced without destroying the effectiveness of the device or the mounting, particularly of its carbide element, and even where the device is used for more arduous vehicle usage, such as in connection with truck, trailer or airplane tires;

Another object of my invention has been to provide an improved type of joint between a hard metal element, such as a carbide element which serves primarily as a friction or traction element in a tire, and a holder for positioning such element within a tire;

Another object of my invention has been to provide a new and improved type of anti-skid or traction device and construction for use in tires that will greatly increase the effective operating life within a particular tire;

These and other objects of my invention will appear to those skilled in the art from the illustrated embodiments, the drawings and the claims.

In the drawings, FIGURE 1 is an enlarged side view of a wear-resisting anti-friction element part or pin which is utilized in accordance with my invention;

Figure 5:
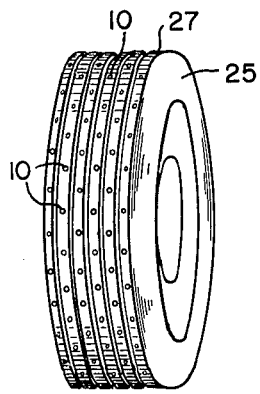

And, FIGURE 5 is a reduced isometric view in elevation showing a tire with traction devices of my invention in a mounted operating position within the tread thereof.

In accordance with my invention, I make use of a wear-resistant hard metal element, pin or part which requires no special surface, other than one that is substantially uniform or symmetrical and which may be directly formed from carbide powders in a conventional die under the application of sintering heat and pressure. That is, the surface may be smooth and the diameter of the element, as produced, should be substantially uniform along its length. Although tungsten carbide is an optimum material, other carbides, and borides (such as titanium boride) with a binder, etc. are suitable for the element.

Instead of providing a holder of a non-conductive material, such as a resin, I employ a holder which is formed of an efficient or highly conductive and shape-retaining metal material, such as aluminum, copper, steel, nickel or alloys thereof. In this connection, a satisfactory and relatively inexpensive metal is an aluminum alloy having the industrial specification of 6262T-9. This alloy is highly conductive, has good wear resistance, and is particularly resistant to corrosive materials, such as may be encountered in the use of it in a tire. I prefer a metal such as aluminum or copper which, although shape-retaining, will wear down with the tire tread. The carbide element is mounted in a longitudinal hole or central bore in the holder that is open at its front end and is closed at its back end, and whose diameter is in the neighborhood of about .001 to .002 of an inch less than the the outer diameter of the carbide element. A tight pressure or interference fit is provided by endwise-forcing the majority of the length of the pin-like carbide element into such bore hole.

Since the crux of the problem is in providing a heat-dissipating, good conductive, secure and foolproof joint between the holder and the carbide element, I utilize a bonding and sealing cement which is applied by wetting the surfaces of both the holder and the element before the element is inserted or pressed into position. I also form the joint in such a manner that there is a metal-to-metal abutment between the engaging surfaces of the element and the wall and end of the bore. A suitable cement for this purpose is an epoxy type which I have found has limited shrinkage during cure and which may be heat-cured at about 300° to 400° F. However, it is necessary to clean both surfaces prior to the use of the epoxy to provide a good bond. That is, the surfaces must be clean and grease-free. Sand blasting is preferable, followed by degreasing, as by a soak in a 10% solution of sodium metasilicate at a temperature of about 150°. After treating, the surfaces are rinsed in tap water and thoroughly dried and the epoxy cement is then applied as soon as possible or immediately thereafter.

In one commercial type of epoxy cement, the maximum strength is reached after a two-hour cure at about 400° F. I have found that an epoxy cement will withstand momentary temperatures of up to about 450° F. and higher without losing its bonding strength and particularly where, as here, a holder is provided which is highly conductive. An important and surprising result is, possibly due to the tight interference fit, that the use of a wetting cement between the opposed surfaces of the carbide element and the holder does not act as an insulator therebetween. The cement as used by me is employed to wet the opposed surfaces and penetrate interstices of the carbide element so that a fully conductive, abutting seal is formed between the surfaces. On experimentation, I found that heat transfer or dissipation is substantially the same as when no cement is used; a metal-to-metal contact is provided between the surfaces. I make use of a smooth surface engagement between side and end surface portions of the carbide element and the end and side surface portions of the depression, cavity or bore in the holder.

Figure 1:
FIGURE 1A is an end view on the same scale as and of the element part of FIGURE 1.
Figure 1A:
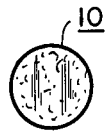

In FIGURES 1 and 1A of the drawings, I have shown a metal carbide, wear-resistant, anti-skid or traction element or part 10 which may be of a conventional carbide that is produced by placing suitable powders, such as of tungsten carbide, mixed with a binder in a die or mold, and pressing and heat sintering the powders in the mold to form a solid hard metal shape, such as the illustrated cylindrical shape. If the ends of the shape have a slightly enlarged diameter, tumbling may be employed to provide the element 10 with a substantially uniform diameter along its length.

Figure 2:
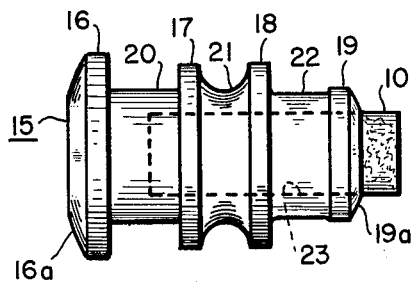
FIGURE 2 is a side view in elevation on the same scale as FIGURE 1, showing a traction device of my invention which employs a highly-conductive plug-like holder and the element of FIGURE 1.
Figure 2A:
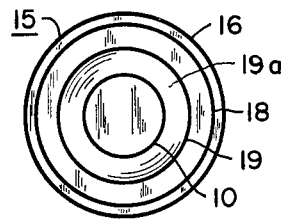
FIGURE 2A is a front end view on the scale of and of the device of FIGURE 2.

In FIGURES 2 and 2A, I have shown a plug-like metal holder 15 constructed in accordance with my invention in which an element 10 is secured in a mounted position to provide a complete traction unit or device therewith. The holder 15 is illustrated as having latch projections of annular or ring-like flange form. A bottom or back end flange 16 is shown as having a maximum diameter. A pair of cooperating intermediate and spaced-apart second 17 and third annular flanges 18 are shown of similar construction and of intermediate diameter; and, a front end flange 19 is shown of the smallest diameter. The bottom flange 16 is shown spaced by a cylindrical stem portion 20 from the second flange 17, and the second flange 17 is shown spaced by a grooved or concavely-curved annular stem portion 21 with respect to the third flange 18. The third flange 18 is shown spaced from and connected to a front or fourth flange 19 by a cylindrical stem portion 22.

As illustrated, the stem portion 20 has the greatest length or extent, the stem portion 22 has a slightly lesser extent or length, and the stem portion 21 has the minimum extent or length. The flange portions above-mentioned are all of annular or ring-like shape. The first or bottom flange portion 16 has a flat base face and is beveled from such flat base face, as indicated by 16a, along its outer or circumferential bottom edge. The outer diameter of each of the flanges is defined by an annular band of planar section whose width is substantially the same as to each of them. It will be also noted that the valley of the grooved stem portion 21 has an O.D. that is substantially the same as the O.D. of the cylindrical stem portion 20, while the stem portion 22 has a slightly lesser diameter. The fourth or front flange 19 has a forwardly-sloped face 19a from its circumferential band that terminates at a central bore 23 which is centrally disposed within the body of the holder 15 and is open at its forward end. The bore 23 has a substantially uniform diameter along its length to receive the major length portion of the carbide element 10 therein, as shown in FIGURE 2. The bore 23 provides a complementary fit for the element 10; both are illustrated as cylindrical in shape.

Figure 3:
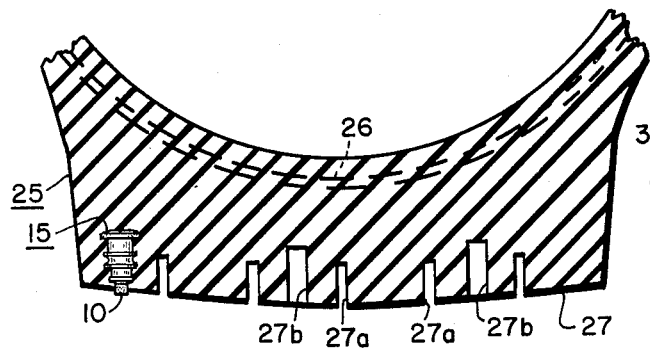
FIGURE 3 is a reduced cross-sectional view in elevation through a conventional tire having openings or holes for receiving a traction device of my invention and showing one device in a secured, operating position within the tread of the tire.

In FIGURE 3, a conventional vehicular tire 25 having cord or fabric reinforcing 26, a rubber-like tread or camelback 27, and conventional mold cuts 27a in its tread, is shown provided with traction-device-receiving holes 27b. The holes 27b drilled or formed to project inwardly from the forward or wear face of the tread 27 and are illustrated as being of cylindrical symmetrical shape open to the tread. A traction device including the holder 15 and carbide element 10, is shown mounted in one of the holes; it illustrates how an adjacent wall portion of the incompressible resilient tread material 27 is displaced to provide a secure and tight, pinching-in, pressure latching action about the holder 15 in cooperation with its flanges. It will be noted that when the holder 15 is mounted within the tread 27 of the tire 25 that all the flanges are embedded within the rubber.

Figure 4:
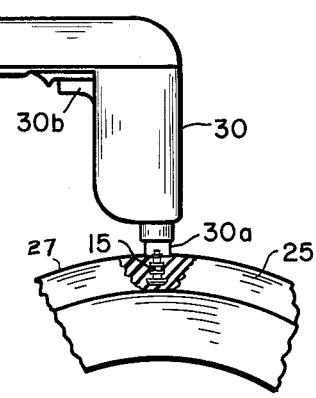
FIGURE 4 is a reduced somewhat diagrammatic view, showing how a device of my invention may be mounted in a hole drilled or formed within a pre-formed tread of a tire.

In FIGURE 4, I have shown a suitable tool, such as an air or pneumatic operated tool 30 which has a plunger-like grip head 30a for receiving a traction device to force its holder 15 into position within a hole 27b tire by the operation of a trigger valve 30b which permits air under high pressure to be introduced from the line 30c through the tool 30 to the plunger-like head 30a.

In FIGURE 5, I have illustrated a tire 25 with the devices or plug units of my invention in a mounted position about the outer circumference thereof, and with their carbide elements 10 in a projecting relation from the front face of the tread.

Although traction devices of my invention may be mounted within the camelback or rubber tread during the forming of the tire, I find that they can also be mounted after the tread has been formed by drilling-out cylindrical holes at staggered or spaced locations in the tread, which are much smaller in diameter than the outer diameter of the holder, and which are preferably of a depth that is slightly greater than the length of the holder 15. The opening or hole in the tread should be of such a depth as to embed the holder and to leave at least a portion of the tread between the base of the holder and the fabric of the tire.

By utilizing an air pressure gun 30, a device of my invention may be quickly shot or pushed into a tire opening and will be retained in position by the displacement of the non-compressible rubber material which conforms in shape with and becomes complementary to suitably constructed, offset, outer latching portions of the holder to fully accommodate the holder and securely-resiliently retain it in position therein.

The holder 15 of the drawings is shown provided with a series of longitudinally spaced-apart flanges, annuluses or rings 16, 17, 18 and 19 which have a graduated or decreasing outer diameter towards its forward end. The base or back end of the holder has the largest diameter of ring 16 of mushroom-like shape and its spacing with respect to the next adjacent ring 17 is greater than the spacing between such adjacent ring and the next ring 18. Also, the diameter of the stem between adjacent rings is slightly less forwardly of the holder. Such a design or construction of the outer surface of the holder assures a secure, complementary, locked-in compression fit or joint with the displaced resilient rubber tread material and makes unnecessary the use of a cement, although, if desired, a latex or other suitable cement may be used. The holder 15 is so positioned that the extending end portion of carbide element 10 projects about 1/32 or .016 of an inch outwardly beyond the exposed face of its rubber-like tread 27.

By way of example, I have successfully employed a carbide element 10 of cylindrical or rounded shape having a total overall length of about .387 of an inch, a substantially symmetrical or uniform outer diameter of about 1/8 or .125 of an inch, and extending about 1/16 or .063 of an inch from the end of the holder. Further, by way of example, I have employed a holder 15 having an inner or back end button, or annular flange or ring of about 5/16 or .313 of an inch O.D., of about 1/16 or .063 of an inch in width, and preferably provided with beveling 16a along the outer edge of its bottom face. I have provided an O.D. of stem 20 between the bottom button or flange 16 and the next adjacent flange 17 of an extent or length of about 7/64 or .109 of an inch, and having a substantially cylindrical O.D. of about 3/16 or .188 of an inch. I have provided the second flange 17 which lies adjacent to the bottom flange or button 16 of an O.D. of about 9/32 or .281 of an inch, and a width of about 1/32 or .031 of an inch.

Also, I have employed a connecting stem portion 21 between the second 17 and the third flanges 18 (both are intermediate flanges) that is of rounded grooved shape, as provided by beveling it from the opposed faces of the second and third flanges, that has an extent or length of about 5/64 or .078 of an inch and that defines a valley at a mid-pont between the two flanges of an O.D. of about 3/16 or .188 of an inch. The third flange 18 from the back end may have an O.D. of about 9/32 or .281 of an inch and a width or band of flange the same as the width of the second flange 17 (1/32 or .031 of an inch). The fourth flange from the bottom end or the forward end flange 19, may have a width of about 1/32 or .031 of an inch, and an O.D. of about 13/64 or .203 of an inch, and a forward face that is beveled forwardly or is of frusto-conical shape and that extends forwardly from the flange to the circumferential edge of a central bore 23 about 1/64 or .016 of an inch.

The overall length of the holder 15, centrally-axially thereof from its bottom or abutment end to the opening in the bore of its front end, may be about 29/64 or .453 of an inch. The bore or open-end hole 23 in the holder 15 may have a depth extending from the forward end thereof of about .324 of an inch and a smooth and substantially uniform cylindrical wall surface therealong of a diameter about .123 to .124 of an inch, so as to provide an interference fit when the cylindrical wall surface of the carbide element 10 is forced into position therewithin. It will be noted that the element 10 shall have an outer layer diameter, for example .125 of an inch, in order to provide about .001 to .002 of an inch interference fit with the bore 23. Both the bore of the holder and the outer diameter or circumference of the carbide element will preferably have smooth and complementary, rounded, symmetrical surfaces.

Using a device of such exemplary dimensions, I may provide a diameter of receiving hole 27b in the tire tread 27 which incidentally is cylindrical, of about 3/32 or .094 of an inch. When the exemplary traction device is secured in position within the tread of the tire, as shown in FIGURE 3, the front or forwardly sloped or beveled face 19a of the front flange 19 may be covered with a thin layer of the rubber tread material. Thus, although the forward end of the carbide element 10 may project about 1/16 of an inch beyond the inner edge of the face 19a that surrounds the bore 23, the carbide tip will project beyond the face of the rubber tread 27 only about 1/32 of an inch.

I have used a Tinius Olsen machine for measuring shear strength in making push-out tests which involve the employment of an endwise force between the holder and the carbide element, in order to test the holding or bonding action and to compare it as between samples using no cement, those using other cements and those using the optimum, a heat-cured epoxy cement. Before the tests were conducted, the closed bottom end of the holder was sheared-off in order to apply the shearing force towards its open top or front end.

In one test, I employed an element having an average diameter of .118 of an inch which provides a side surface area of about .011 of a square inch, having a length of between .486 to .507 of an inch, at the start, and inserted in a holder having an average bore diameter of about .117. I conducted comparative tests using three specimens for each and found that an average force of 830 pounds or approximately 830,000 lbs./sq. in. was required to push-out the element where a heat cured epoxy was employed in accordance with my invention, and that even using a large drill hole in the holder of .125 of an inch, it required an average of about 560 pounds to dislodge the element. On the other hand, using water glass as the cement, an average of only 166 pounds was required where an interference fit was provided by employing a bore diameter in the holder of .117 of an inch; the tip element fell out on contact where the hole diameter of the holder was .125 of an inch.

Various other cements were employed. One provided an average hold of up to 335 pounds, where an interference fit as above indicated was provided, and an average of two pounds where an enlarged .125 hole was utilized in the holder. This demonstrated that it was important to use a heat-cured epoxy to attain a maximum bonding strength. The wetting film should be within a range of about .005 to .010 for best results with, of course, both surfaces being wetted. The tests indicated that an interference or pressure fit as provided in accordance with my invention is important for optimum results and that it is essential where no cement or a poor type is used. An average of about 91 pounds was required to dislodge the element where the hole in the holder was about .117 of an inch and no cement was used. In any event, from the standpoint of proper heat conduction, however, an interference or a pressure-engaging type of fit is essential.

I have also discovered that it is important to avoid substantially more length exposure of the tip element at its end than about 1/2, in that this also has an influence on the holding strength. For example, a tip element that is exposed for about 2/3 of its length can be pushed out with about 1/4 to 2/5 of the amount of pressure that is required if it is exposed for about 1/3 of its length. A 1/3 extension represents the optimum maximum; as above pointed out, it may extend up to a maximum of about the length of the portion that is within the holder.

As to the number of devices, I have found that it is desirable to stagger them in the tread of the tire and that an average of about 100 for representative sizes of passenger car tires is satisfactory for icy conditions, but that the number may vary from about 88 to about 128 in tires of exemplary sizes of 7.50–14, 6.70–15, 8.00–14 and 15, etc.

While I have for the purpose of illustration shown an exemplary embodiment of my invention, it will be understood that various changes may be made in its construc-

What I claim is:

1. A traction device for mounting in the tread of a tire which comprises, a plug-like metal holder characterized by its good heat conductivity and shape retention, said holder having a rounded central bore of substantially uniform diameter therealong that is open at its front end and extends therewithin and that is closed at its bottom end, a solid wear-resistant hard metal element having a rounded shape therealong that is substantially complementary with and is of slightly larger diameter than said bore, said element being positioned to extend along the major portion of its length within said bore to project a short distance from the front end of said holder, said element having a tight interference fit within said bore along the full major portion of its length that is within said bore to provide a heat-conductive pressure-engagement along its surface with said holder within said bore, and said holder having projecting portions in a spaced relation along its outer surface to hold and position said holder within complementary abutting portions of the tread to retain said holder therein.

2. A traction device as defined in claim 1 wherein, said bore and said element are cylindrical in shape, and the interstices of and the surface of said element are wetted by and said element is secured to said bore by a high-temperature-resistant cement in such a manner as to retain the heat-conductive engagement therebetween.

3. A traction device as defined in claim 1 wherein, said element and said bore have a smooth surface engagement therebetween, and a heat-cured epoxy cement along the surface engagement secures the carbide element in position within said bore.

4. A traction device as defined in claim 1 wherein said holder is of a good conducting metal of the class consisting of aluminum, nickel, steel, copper and their alloys, said element is of a hard metal material of the class consisting of carbides, and borides, and said element extends a maximum of about ⅓ its length from said holder.

5. A traction device as defined in claim 1 wherein said projecting portions of said holder comprise a group of spaced-apart annular flanges of substantially equal width and of planar outer section along said holder of graduated lesser diameter from the back end to the front end of said holder.

6. A traction device for mounting in an open-end hole in the tread of a tire which comprises, a plug-like metal holder characterized by its good heat conductivity and shape retention, said holder having a smoothly cylindrical central bore open at its front end and extending therewithin and closed at its bottom end, a solid wear-resistant metal carbide element having a shape therealong that is smoothly cylindrical and substantially complementary with and is of slightly larger diameter than said bore, said element being positioned to extend along the major portion of its length within said bore to project a short distance from the front end of said holder, said element having a tight interference fit within said bore along the full major portion of its length that is therewithin to provide a pressure-engagement along its surface with said holder within said bore, said holder having projecting portions in a spaced relation along its outer surface to hold and position said holder within complementary abutting wall portions of the hole in the tread to retain said holder therein, and the engaging surfaces of said element and said bore being in a metal-to-metal heat-conducting relation and being wetted by a securing epoxy cement.

7. A traction device as defined in claim 6 wherein said engaging surface of said element and said bore are wetter with and secured together by a heat-cured epoxy cement.

8. A traction device for positioning in an open-end hole in a resilient tread of a tire which comprises, a metal holder characterized by its good heat conductivity and shape retention, said holder having a central bore therealong that is open to its front end, a wear-resistant carbide element positioned to extend along the major portion of its length within the bore of said holder and having a fully abutting tight pressure-engagement along the major portion of its length with wall portions of said bore, said holder having a mushroom-shaped bottom end flange and spaced-apart ring flanges along its length towards its front end portion that are connected by stem portions of said holder to define positioning means for secure latching engagement with complementary abutting resilient wall portions of the hole in the tread of the tire to retain said holder therein with said carbide element projecting forwardly therefrom; said ring flanges comprising, a pair of spaced-apart intermediate flanges and a front end flange, said bottom end flange and said ring flanges having planar outer sections of substantially equal width and being of graduated lesser diameter from said bottom end flange to said front end flange.

9. A traction device for positioning in an open-end hole in a resilient tread of a tire which comprises, a plug-like holder of a metal having good heat conductivity and shape retention, said holder having a central bore therealong that is open to its front end, a solid wear-resistant metal carbide element having about .001 to .002 of an inch larger diameter than said bore and a tight interference fit within said bore and positioned to securely extend along the major portion of its length within the holder and to project a short distance of about ⅟₁₆ of an inch from the front end of said holder; said holder having a graduated group of ring-like flanges of planar and substantially equal width outer section in a spaced-apart relation therealong to, in combination with connecting stem portions of said holder, define latching-positioning means for cooperating with complementary abutting resilient wall portions of the hole in the tread of the tire to retain said holder therein.

10. A tire construction having a reinforcing fabric and a resilient rubber-like tread provided with a plurality of substantially cylindrical holes extending inwardly from a front face of the said tread and terminating within said tread in front of said fabric, a plurality of plug-like traction devices, each of said devices having an efficient heat-conducting metal holder defined by a stem having ring-like flange portions therealong of enlarged diameter with respect to the holes in said tread, each of said holders having a substantially smooth cylindrical central bore therealong that is open to the front end thereof, each of said holders having a solid substantially smooth cylindrical-shaped wear-resistant pin-like metal carbide element of slightly larger diameter than and being tightly interference fit and positioned to securely extend along its major length portion within said bore and to project a short distance from the front end thereof and having an abutting heat-conducting relation along said major length portion with said holder, each of said holders being embedded within a cooperating hole of said tread with resilient wall portions of the cooperating hole being in tight complementary locking engagement with said stem and ring-like flange portions of each said holder to securely retain each said holder therein with its said carbide element projecting forwardly of the front face of said tread.

11. A tire construction as defined in claim 10 wherein, each said carbide element has a smooth-surface heat-conductive engagement with the bore of its associated holder, and a cured epoxy cement secures and seals engaging surfaces of said element and said bore together.

12. A tire construction as defined in claim 11 wherein said holder is of aluminum metal, and said element is of a hard sintered carbide metal.

13. A tire construction as defined in claim 11 wherein, each said holder has a tapered front end face that is covered by said tread, said carbide element extends from said tapered front end face through said tread and about 1/32 of an inch outwardly of a front face of said tread, said bore and said carbide element have smooth abutting cylindrical wall surfaces, and the outer diameter of said carbide element is about .001 to .002 of an inch larger than the inside diameter of said bore to provide the interference fit therewith.

14. A traction device for mounting in the tread of a tire which comprises, a plug-like metal holder characterized by its good heat conductivity and shape retention, said holder having a central bore open at its front end and extending therewithin and closed at its bottom end, a wear-resistant hard metal element having a shape therealong that is complementary with said bore, said element being positioned to extend along the major portion of its length within said bore to project a short distance from the front end of said holder, said element having heat-conductive pressure-engagement along its surface with said holder within said bore, said holder having projecting portions in a spaced relation along its outer surface to hold and position said holder within complementary abutting portions of the tread to retain said holder therein; said projecting portions of said holder comprising, a rounded base flange, intermediate spaced-apart rounded flanges and a rounded front end flange, said base flange being of the greatest diameter, and said intermediate flanges being of intermediate diameter and said front end flange being of the smallest diameter.

15. A traction device as defined in claim 14 wherein, said base flange has a beveled portion about its base face and has a planar front face, said intermediate flanges have a stem portion of annular shape that is curved therebetween, a back one of said intermediate flanges has a planar back face, a front one of said intermediate flanges has a planar front face, and said front end flange has a forwardly-sloped front face extending to the open end of said bore.

16. A traction device as defined in claim 14 wherein, said base flange is connected to a back one of said intermediate flanges by a cylindrical stem portion, said back one of said intermediate flanges is connected to a front one of said intermediate flanges by an annularly-grooved stem portion whose valley has a diameter corresponding to the diameter of said cylindrical stem portion, said front one of said intermediate flanges is connected to said front end flange by a cylindrical stem portion of a smaller diameter than said first-mentioned stem portion, and all of said flanges having substantially cylindrical annular banding faces thereabout that are of graduated lesser diameter along said holder from said base flange to said front end flange.

References Cited by the Examiner

UNITED STATES PATENTS

| | | | |
|---|---|---|---|
| 2,652,876 | 9/1953 | Eisner | 152—210 |
| 3,125,147 | 3/1964 | Hakka | 15—210 |

FOREIGN PATENTS

| | | |
|---|---|---|
| 1,317,619 | 3/1962 | France. |

ARTHUR L. LA POINT, *Primary Examiner.*

C. W. HAEFELE, *Assistant Examiner.*